(12) United States Patent
Hayashi

(10) Patent No.: US 11,017,573 B2
(45) Date of Patent: May 25, 2021

(54) INFORMATION PROCESSING DEVICE, DISPLAY SYSTEM, AND NON-TRANSITORY COMPUTER READABLE MEDIUM

(71) Applicant: FUJI XEROX CO., LTD., Tokyo (JP)

(72) Inventor: Kazuto Hayashi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 86 days.

(21) Appl. No.: 15/893,818

(22) Filed: Feb. 12, 2018

(65) Prior Publication Data

US 2018/0276864 A1  Sep. 27, 2018

(30) Foreign Application Priority Data

Mar. 23, 2017 (JP) .............................. JP2017-058241

(51) Int. Cl.
| | |
|---|---|
| *G06K 9/00* | (2006.01) |
| *G06T 5/50* | (2006.01) |
| *G06T 11/00* | (2006.01) |
| *G06T 11/60* | (2006.01) |
| *G06T 7/55* | (2017.01) |
| *G06T 7/00* | (2017.01) |

(52) U.S. Cl.
CPC .............. *G06T 11/60* (2013.01); *G06T 7/55* (2017.01); *G06T 7/97* (2017.01); *G06T 11/00* (2013.01); *G06K 9/00281* (2013.01); *G06K 9/00362* (2013.01); *G06T 5/50* (2013.01)

(58) Field of Classification Search
CPC .. G06K 9/00362; G06K 9/00281; G06T 5/50; G06T 7/55; G06T 11/60; G06T 7/97; G06T 11/00

See application file for complete search history.

(56) References Cited

U.S. PATENT DOCUMENTS

| | | | | |
|---|---|---|---|---|
| 2009/0193055 A1* | 7/2009 | Kuberka | ................. | G06F 16/51 |
| 2013/0176472 A1* | 7/2013 | Kang | ..................... | H04N 5/232 |
| | | | | 348/333.01 |
| 2014/0331246 A1* | 11/2014 | Schneiderman | ........................... | |
| | | | | H04N 21/44008 |
| | | | | 725/19 |
| 2015/0116353 A1* | 4/2015 | Miura | ..................... | G06T 11/60 |
| | | | | 345/632 |
| 2016/0212406 A1* | 7/2016 | Hayasaka | .......... | H04N 5/23238 |

(Continued)

FOREIGN PATENT DOCUMENTS

| JP | 2004227158 A | 8/2004 |
|---|---|---|
| JP | 2009139857 A | 6/2009 |

(Continued)

OTHER PUBLICATIONS

Communication dated Nov. 10, 2020, from the Japanese Patent Office in Application No. 2017-058241.

*Primary Examiner* — Kenny A Cese
(74) *Attorney, Agent, or Firm* — Sughrue Mion, PLLC

(57) ABSTRACT

An information processing device includes a selection unit and an embedding unit. The selection unit selects, in a case where a moving image obtained by photographing plural targets that are present in front of a display screen of a display device is displayed on the display screen, plural related targets that are related to each other from the plural targets, based on a frame image of the moving image. The embedding unit embeds a composite image obtained based on an image of at least part of the plural related targets and a presentation image into the frame image.

12 Claims, 14 Drawing Sheets

(56) References Cited

U.S. PATENT DOCUMENTS

2017/0206691 A1* 7/2017 Harrises ............. G02B 27/0172
2018/0182141 A1* 6/2018 Caballero ............... G06T 11/00

FOREIGN PATENT DOCUMENTS

| JP | 2011-175070 A | 9/2011 |
| JP | 2011-175418 A | 9/2011 |
| JP | 2013080135 A | 5/2013 |
| JP | 2013140196 A | 7/2013 |
| JP | 2014165613 A | 9/2014 |

* cited by examiner

INFORMATION PROCESSING DEVICE, DISPLAY SYSTEM, AND NON-TRANSITORY COMPUTER READABLE MEDIUM

CROSS-REFERENCE TO RELATED APPLICATIONS

This application is based on and claims priority under 35 USC 119 from Japanese Patent Application No. 2017-058241 filed Mar. 23, 2017.

BACKGROUND

Technical Field

The present invention relates to an information processing device, a display system, and a non-transitory computer readable medium.

SUMMARY

According to an aspect of the invention, there is provided an information processing device including a selection unit and an embedding unit. The selection unit selects, in a case where a moving image obtained by photographing plural targets that are present in front of a display screen of a display device is displayed on the display screen, plural related targets that are related to each other from the plural targets, based on a frame image of the moving image. The embedding unit embeds a composite image obtained based on an image of at least part of the plural related targets and a presentation image into the frame image.

BRIEF DESCRIPTION OF THE DRAWINGS

Exemplary embodiments of the present invention will be described in detail based on the following figures, wherein.

DETAILED DESCRIPTION

Exemplary embodiments of the present invention will be described in detail with reference to drawings.

First Exemplary Embodiment

Figure 1:
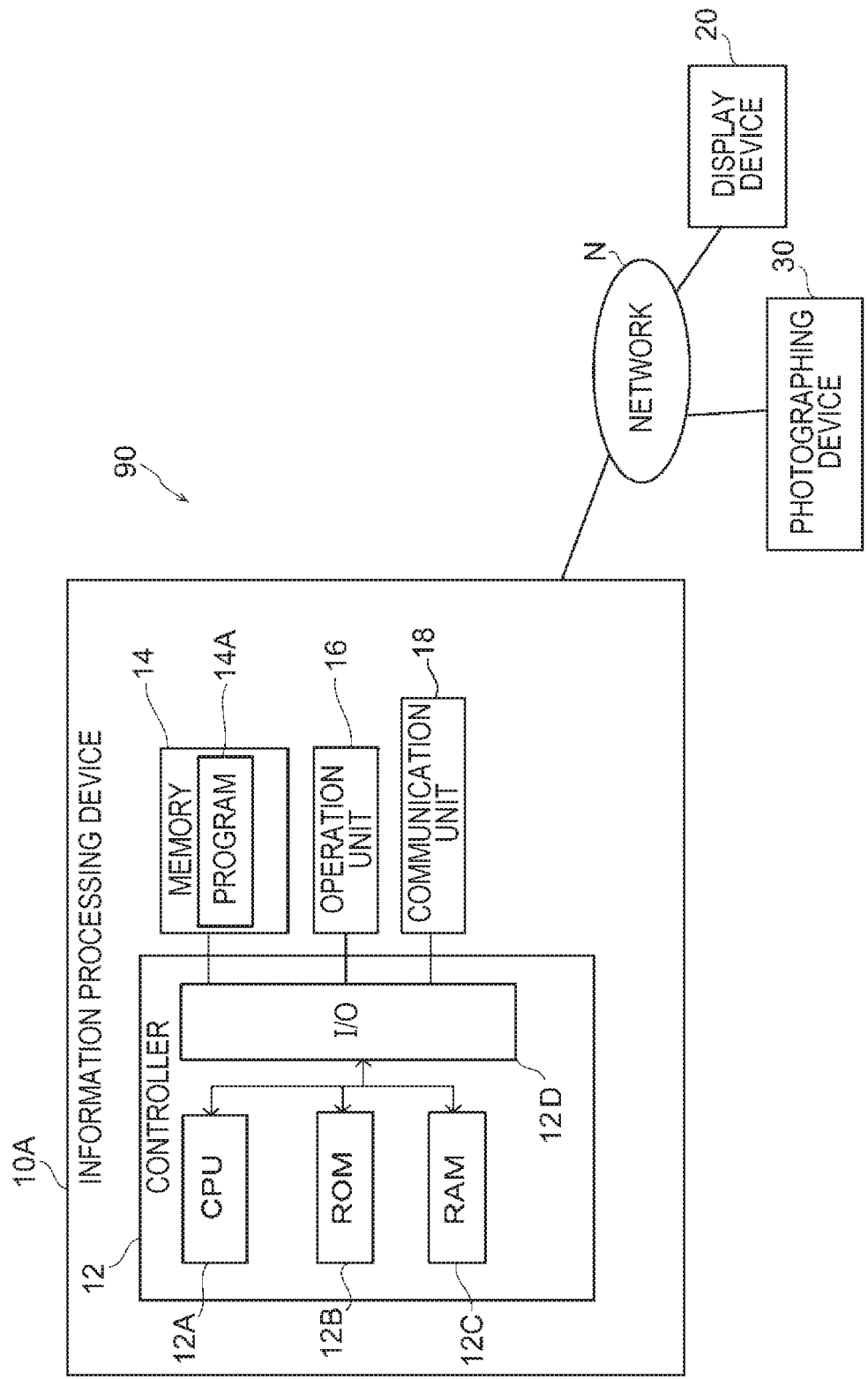
FIG. 1 is a block diagram illustrating an example of a configuration of a display system according to a first exemplary embodiment.

FIG. 1 is a block diagram illustrating an example of a configuration of a display system 90 according to a first exemplary embodiment.

As illustrated in FIG. 1, an information processing device 10A according to the first exemplary embodiment is connected to each of a display device 20 and a photographing device 30 via a network N.

The information processing device 10A includes a controller 12, a memory 14, an operation unit 16, and a communication unit 18. For example, a server device or a general-purpose computer such as a personal computer (PC) is used as the information processing device 10A.

The controller 12 includes a central processing unit (CPU) 12A, a read only memory (ROM) 12B, a random access memory (RAM) 12C, and an input/output interface (I/O) 12D. The CPU 12A, the ROM 12B, the RAM 12C, and the I/O 12D are connected to one another via a bus.

Functional units including the memory 14, the operation unit 16, and the communication unit 18 are connected to the I/O 12D. These functional units may communicate with the CPU 12A via the I/O 12D.

The controller 12 may be configured as part of a main controller that controls the entire operation of the information processing device 10A. For example, an integrated circuit (IC) such as a large scale integration (LSI) or an IC chip set is used as part or all of the blocks of the controller 12. Separate circuits may be used as the individual blocks or a partially or entirely integrated circuit may be used. The blocks may be integrated together or some blocks may be provided separately. Furthermore, part of the individual blocks may be provided separately. Integration of the controller 12 does not necessarily adopt LSI. A dedicated circuit or general-purpose processor may be used.

For example, a hard disk drive (HDD), a solid state drive (SSD), a flash memory, or the like is used as the memory 14. A program 14A for causing a process for displaying a composite image to be executed according to an exemplary embodiment is stored in the memory 14. The program 14A may be stored in the ROM 12B.

The program 14A may be, for example, installed in the information processing device 10A in advance. The program 14A may be implemented by being stored in a nonvolatile memory medium or being distributed via a network and being installed into the information processing device 10A in an appropriate manner. For example, a compact disc-read only memory (CD-ROM), a magneto-optical disc, an HDD, a digital versatile disc-read only memory (DVD-ROM), a flash memory, a memory card, or the like is assumed as an example of a nonvolatile memory medium.

The operation unit 16 includes various operation keys such as numeric and alphabetic keys. The operation unit 16 receives various instructions from an operator or the information processing device 10A.

The communication unit 18 is connected to the network N such as a local area network (LAN) or a wide area network (WAN). The communication unit 18 communicates with each of the display device 20 and the photographing device 30 via the network N. In this example, the communication unit 18 is connected to the network N in a wired manner. However, the communication unit 18 may be connected to the network N wirelessly.

For example, a liquid crystal display (LCD), an organic electroluminescence (EL) display, or the like is used as the display device 20.

For example, a video camera or the like including a solid-state imaging device such as a charge coupled device (CCD) or a complementary metal oxide semiconductor (CMOS) is used as the photographing device 30.

In this exemplary embodiment, a case where the information processing device 10A, the display device 20, and the photographing device 30 are provided separately is described. However, the display device 20 and the photographing device 30 may be provided in an integrated manner. Furthermore, the information processing device 10A may be integrated with the display device 20.

Figure 2:
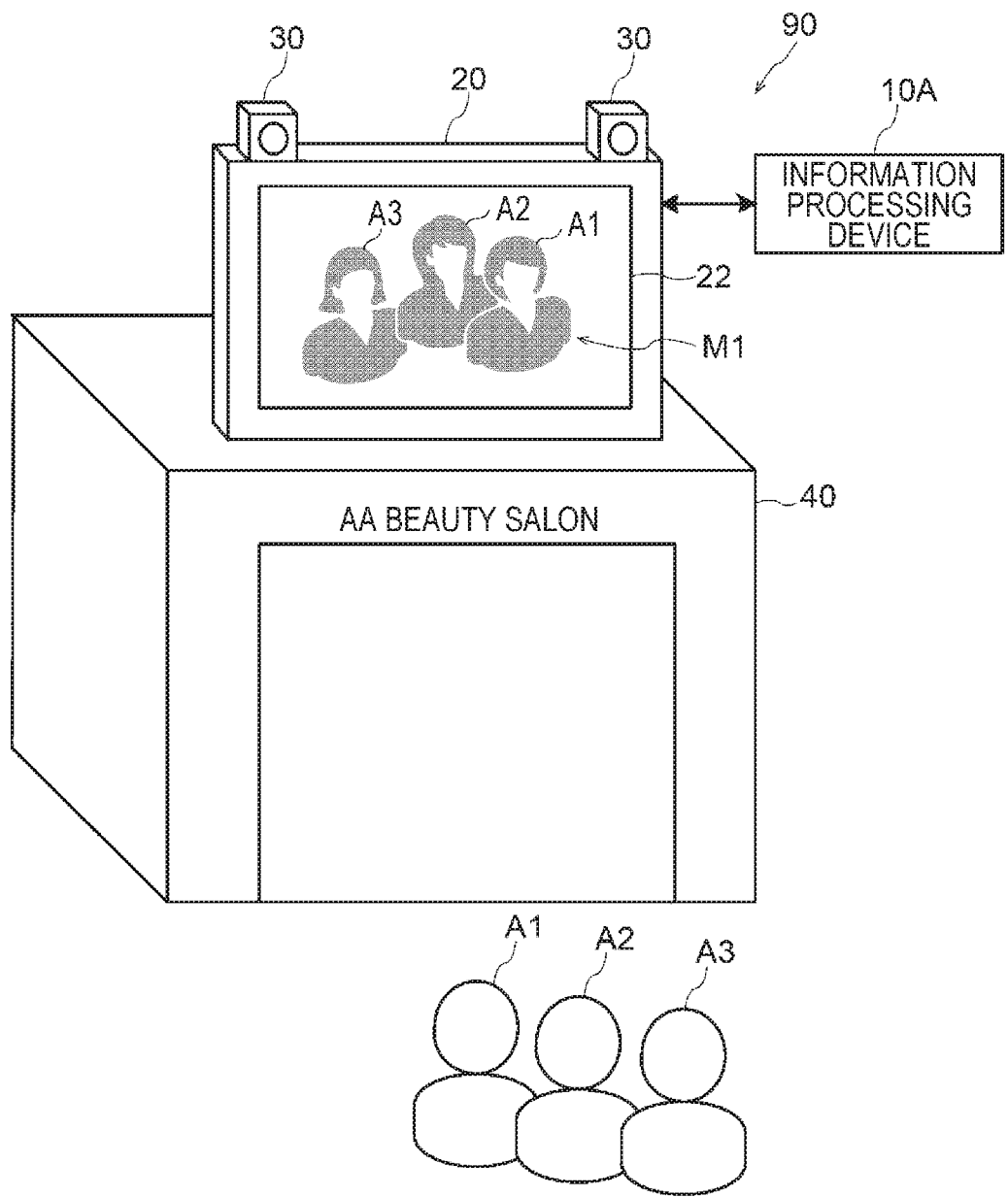
FIG. 2 is a perspective view illustrating an example of how devices configuring the display system according to the first exemplary embodiment are installed.

FIG. 2 is a perspective view illustrating an example of how devices configuring the display system 90 according to the first exemplary embodiment are installed.

As illustrated in FIG. 2, the display device 20 is a large-screen display device, and is installed near a shop 40 (in this example, above the shop 40). The photographing device 30 is installed near the display device 20 (in this example, above the display device 20). In this example, plural photographing devices 30 are installed with predetermined spaces therebetween. With the use of the plural photographing devices 30, depth information which represents the distance from each of the photographing devices 30 to an object is acquired. A specific example of the depth information will be described later. Plural photographing devices 30 may not be provided. Only one photographing device 30 may be provided as long as the distance from the photographing device 30 to an object may be obtained. Furthermore, the place where the information processing device 10A is installed is not particularly limited. The information processing device 10A may be installed in a place distant from the shop 40.

The photographing device 30 according to this exemplary embodiment captures a moving image M1 of plural targets that are present in front of a display screen 22 of the display device 20. Being in front of the display screen 22 includes not only being right in front of the display screen 22 but also being diagonally in front of the display screen 22. The moving image M1 captured with the photographing device 30 is displayed in real time via the information processing device 10A on the display screen 22 of the display device 20. Plural targets may be represented as, for example, plural passersby A1 to A3 illustrated in FIG. 2. In this case, the moving image M1 including the passersby A1 to A3 is displayed in real time on the display screen 22. Furthermore, in this exemplary embodiment, as illustrated in FIG. 2, a case where the moving image M1 including the passersby A1 to A3 is displayed such that the passerby A2 is located on a front side of the passerby A3 and the passerby A1 is located on a front side of the passerby A2 will be described.

Figure 3:
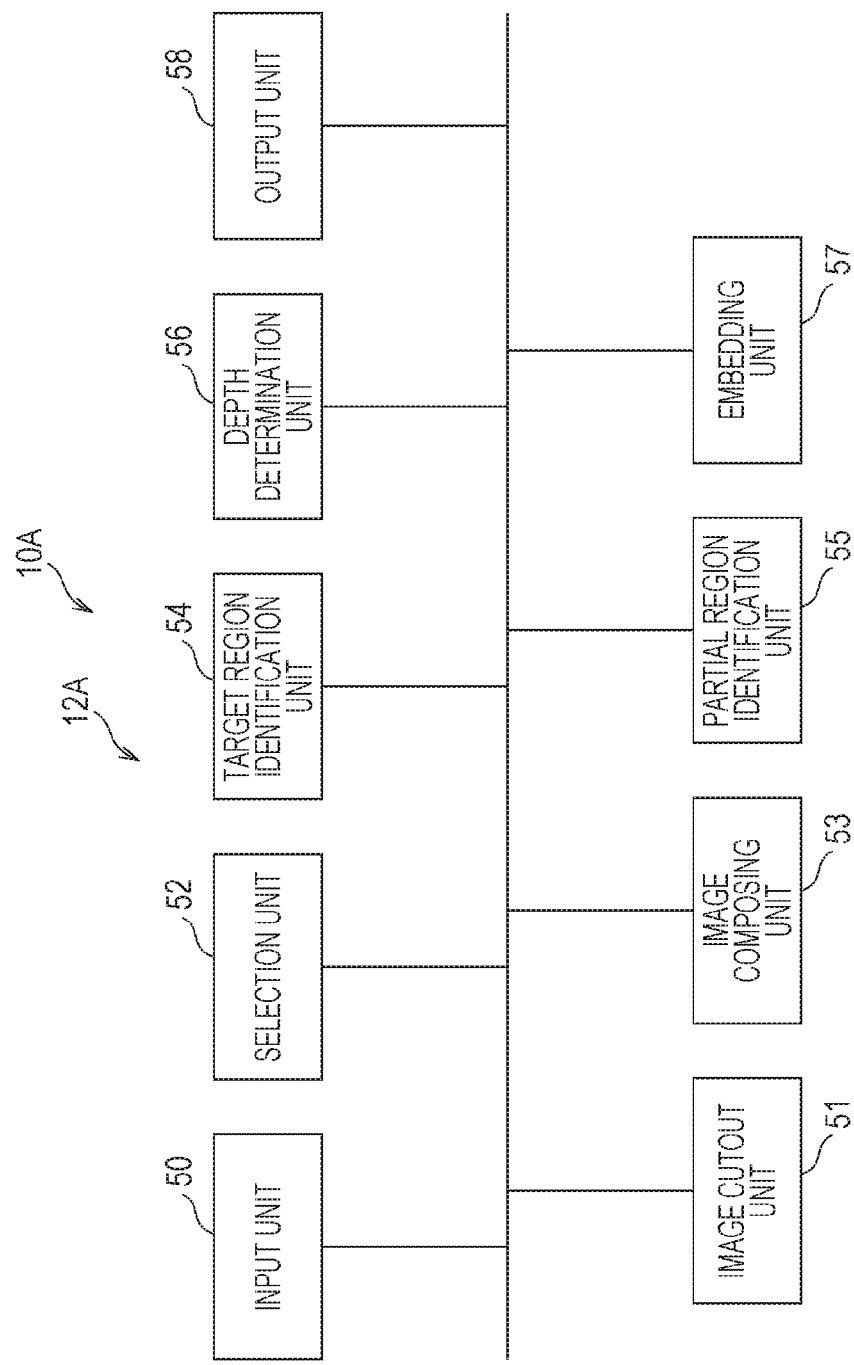
FIG. 3 is a block diagram illustrating an example of a functional configuration of an information processing device according to the first exemplary embodiment.

FIG. 3 is a block diagram illustrating an example of a functional configuration of the information processing device 10A according to the first exemplary embodiment.

As illustrated in FIG. 3, the CPU 12A of the information processing device 10A according to the first exemplary embodiment functions as an input unit 50, an image cutout unit 51, a selection unit 52, an image composing unit 53, a target region identification unit 54, a partial region identification unit 55, a depth determination unit 56, an embedding unit 57, and an output unit 58. The CPU 12A functions as the above-mentioned units when writing the program 14A stored in the memory 14 into the RAM 12C and executing the program 14A.

In this exemplary embodiment, a case where a composite image is displayed on the display device 20 to passersby and some advertising for the shop 40 is thus provided is assumed. In this case, displaying a composite image to plural passersby who are related to each other is considered to achieve higher effective appeal than displaying a composite image to passersby who are not related to each other (for example, a passerby walking along). Passersby who are related to each other include, for example, passersby who have moved together for a predetermined time or more, passersby who have stayed together for a predetermined time or more, and the like. In this case, passersby are highly likely to be a parent and a child, friends, colleagues, acquaintances, or the like. Therefore, if at least one of plural passersby is interested in a composite image, the composite image may be made well known to the other passersby, and a highly effective appeal may thus be expected.

That is, in the case where a composite image is presented to passersby who are not related to each other, an effective appeal by the composite image may not be achieved unless the passersby are interested in the composite image. In contrast, in the case where a composite image is presented to passersby who are related to each other, when any one of the passersby is interested in the composite image, the possibility that all the passersby view the composite image increases, and a highly effective appeal by the composite image may be expected.

In the information processing device 10A according to the first exemplary embodiment, in the case where a moving image obtained by capturing plural targets that are present in front of the display screen 22 is displayed in real time on the display screen 22, the selection unit 52 selects plural related targets that are related to each other. Plural related targets represent targets that are selected from among plural targets based on a frame image of a moving image. Then, the embedding unit 57 embeds a composite image obtained based on at least part of images of related targets and a presentation image into the frame image. Hereinafter, a passerby will be explained as an example of a related target whose image is to be combined with a presentation image. However, the present invention is not limited to this. An animal (called a "pet" in this exemplary embodiment)

accompanied by a passerby may be defined as a related target whose image is to be combined with a presentation image.

According to the first exemplary embodiment, a composite image of at least one passerby out of plural passersby who are related to each other is displayed. Therefore, compared to a case where a composite image of a passerby out of plural passersby who are not related to each other is displayed, a highly effective appeal may be achieved.

Figure 4:
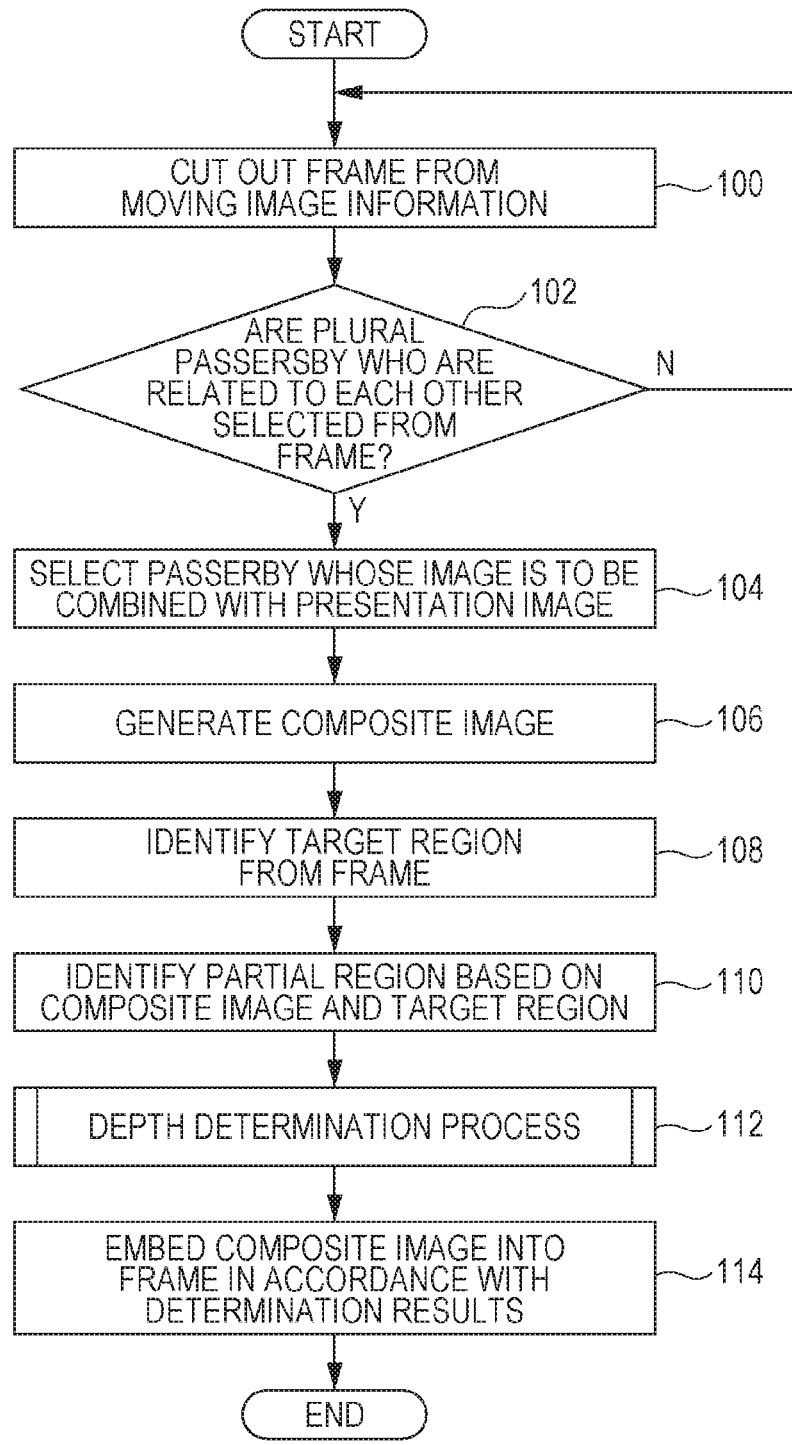
FIG. 4 is a flowchart illustrating an example of the flow of a process of a program according to the first exemplary embodiment.
Figure 5:
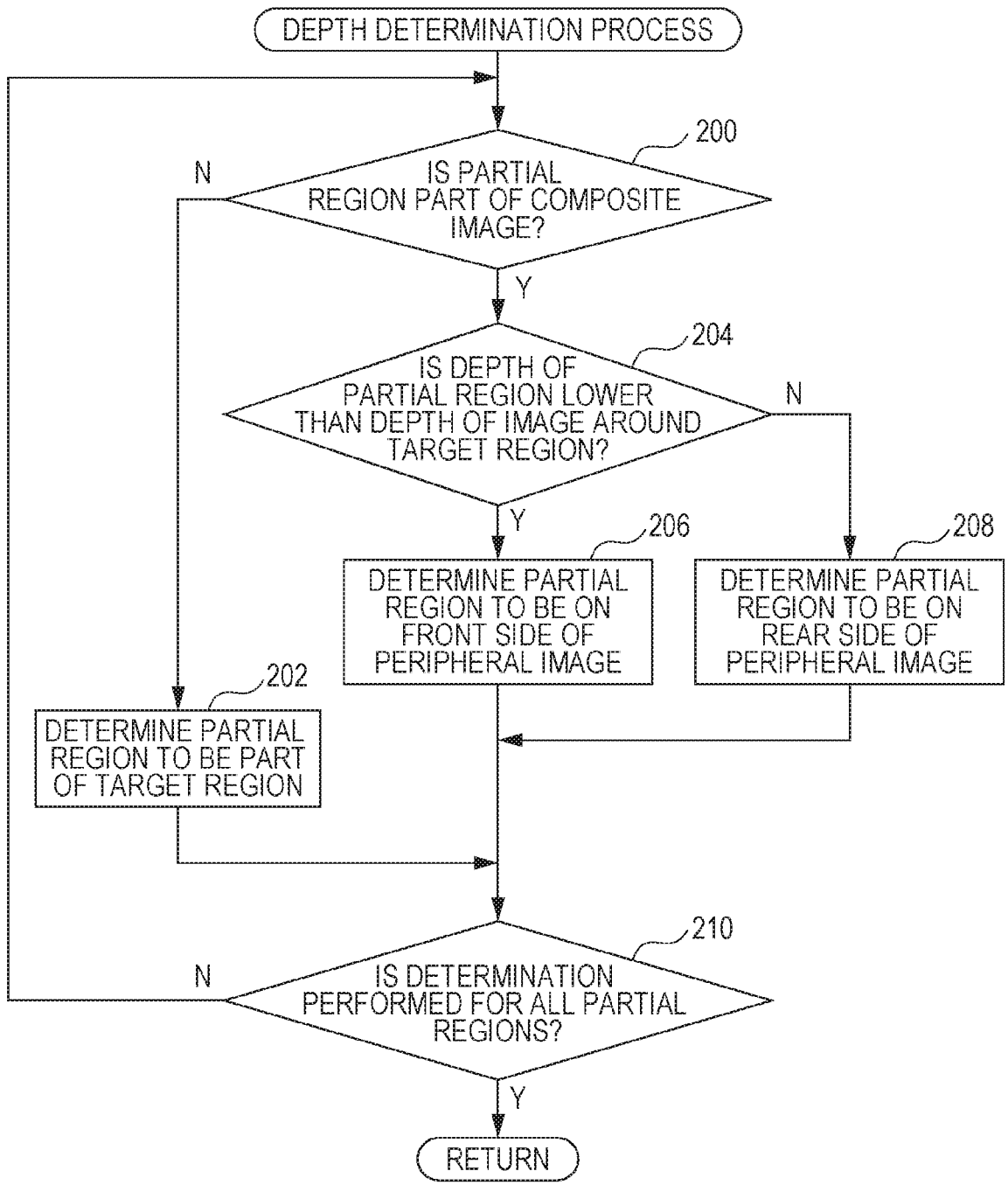
FIG. 5 is a flowchart illustrating an example of the flow of a depth determination process in the program according to the first exemplary embodiment.

Operation of the information processing device 10A according to the first exemplary embodiment will be described below with reference to FIGS. 4 and 5. FIG. 4 is a flowchart illustrating an example of the flow of a process of the program 14A according to the first exemplary embodiment. FIG. 5 is a flowchart illustrating an example of the flow of a depth determination process in the program 14A according to the first exemplary embodiment.

First, when an instruction to execute the program 14A is issued by an operation or the like by an operator, the information processing device 10A receives, via the input unit 50, input of moving image information including plural passersby photographed by the photographing device 30. When it is detected that the photographing device 30 photographs plural passersby, an instruction to execute the program 14A may be issued.

In the example of FIG. 2, input of the moving image M1 including the passersby A1 to A3 is received. On the display screen 22, the moving image M1 is displayed in real time via the input unit 50.

In step 100 of FIG. 4, the image cutout unit 51 cuts out a frame image to be processed from moving image information received by the input unit 50.

Figure 6:
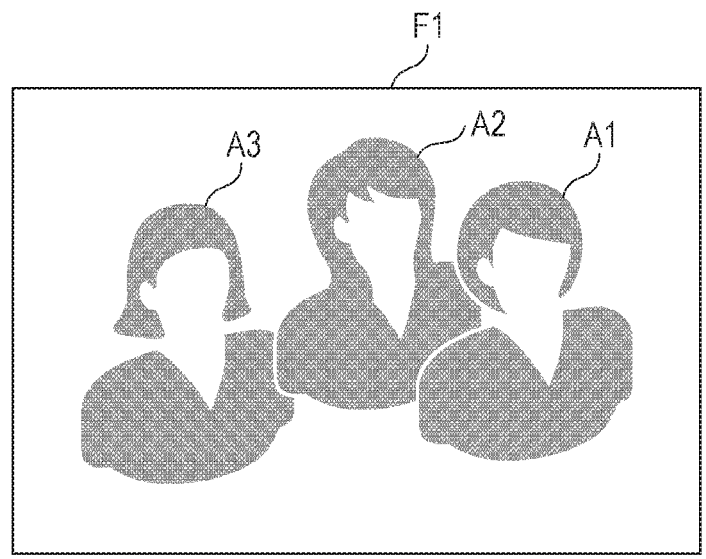
FIG. 6 is a diagram illustrating an example of a frame image in an exemplary embodiment.

FIG. 6 is a diagram illustrating an example of a frame image F1 in this exemplary embodiment.

As illustrated in FIG. 6, the frame image F1 that is cut out from the moving image M1 includes images representing the passersby A1 to A3. A frame image to be cut out as a processing target is not particularly limited. However, it is desirable that a frame image in which the proportion of images representing the passersby A1 to A3 in the frame image is higher than a predetermined value is cut out.

In step 102, the selection unit 52 determines whether or not plural passersby who are related to each other were selected from the frame image. In the case where it is determined that plural passersby who are related to each other were selected (in the case where the determination result is affirmative), the process proceeds to step 104. In contrast, in the case where it is determined that plural passersby who are related to each other were not selected (in the case where the determination result if negative), the process returns to step 100 and repeats the processing.

In the example of FIG. 6, as plural passersby who are related to each other, the passersby A1 to A3 who have moved together for a predetermined time or more are selected. That is, the selection unit 52 selects the passersby A1 to A3 who are related to each other from the frame image F1 cut out by the image cutout unit 51. Specifically, with the use of an object detection technique based on machine learning, the passersby A1 to A3 who are related to each other are selected. For example, a technique such as a faster-region-based convolutional neural network (faster-RCNN) or a single shot multibox detector (SSD) regarding object detection or a convolutional neural network (CNN) incorporated into a field-programmable gate array (FPGA) or the like may be used. With the above technique, the passersby A1 to A3 who are related to each other are selected. As another example of plural passersby who are related to each other, plural passersby who have stayed together for a predetermined time or more, plural passersby who have moved together while talking to each other for a predetermined time or more, plural passersby who have stayed together while talking to each other for a predetermined time or more, or the like may be selected.

In step 104, the selection unit 52 selects, from among the plural passersby who are related to each other, a related target having a predetermined attribute as at least a partial related target whose image is to be combined with a presentation image. As an example of a related target having a predetermined attribute, a passerby is selected as described below.

Figure 7:
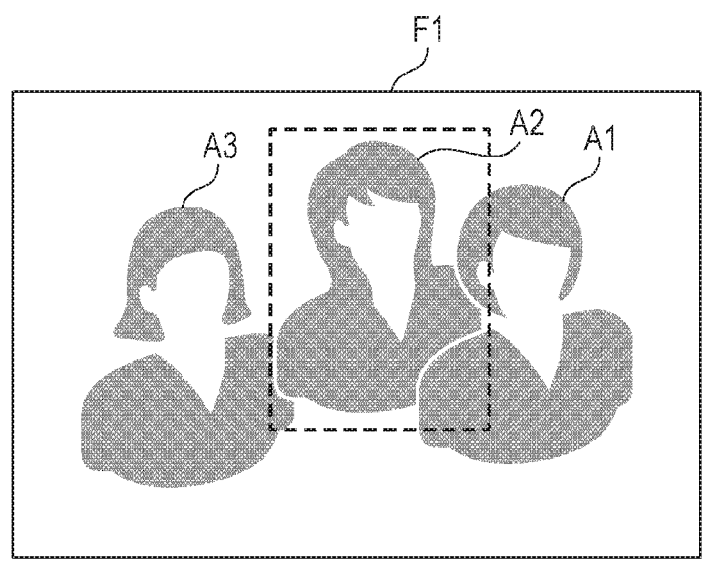
FIG. 7 is a diagram illustrating an example of a state in which a passerby whose image is to be combined with a presentation image is selected from a frame image in an exemplary embodiment.

FIG. 7 is a diagram illustrating an example of a state in which the passerby A2 whose image is to be combined with a presentation image is selected from the frame image F1 in this exemplary embodiment.

An attribute of the passerby A2 illustrated in FIG. 7 is, for example, a "female with long hair". As an attribute, an attribute representing a pet accompanied by a passerby may be used. Selection processing based on the attribute may be implemented by using an object detection technique based on machine learning. With the use of the object detection technique based on machine learning, a passerby may be selected according to various attributes including a "female wearing a skirt", a "female wearing glasses", a "young female", a "middle-aged male", and the like. In the case where, for example, a "young female" is used as an attribute, all the passersby A1 to A3 may be selected as related targets whose images are to be combined with a presentation image. Furthermore, for example, in the case where a "four-legged animal", a "dog", or the like is used as an attribute, a pet such as a dog accompanied by a passerby may be selected as a related target whose image is to be combined with a presentation image.

In step 106, the image composing unit 53 generates a composite image based on an image of the passerby selected as a composition target by the selection unit 52 and a presentation image. In this case, a composite image is generated by combing a presentation image with at least part of an image of a passerby.

Figure 8:
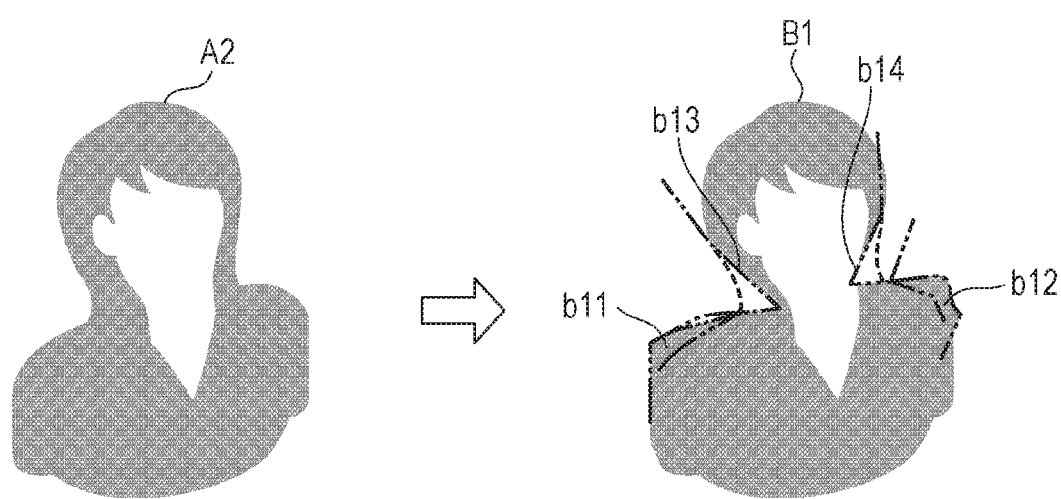
FIG. 8 is a diagram illustrating an example of a composite image obtained based on an image of a passerby and presentation images in an exemplary embodiment.

FIG. 8 is a diagram illustrating an example of a composite image B1 obtained based on an image of the passerby A2 and presentation images b11 to b14 in this exemplary embodiment.

As illustrated in FIG. 8, the composite image B1 is generated by combing part of an image of the passerby A2 with the presentation images b11 to b14. The composite image B1 is generated by, for example, estimating the position and orientation of a specific part of the body of the passerby A2 using machine learning or the like and combining part of the image of the passerby A2 with the presentation images b11 to b14 in accordance with the estimated position and orientation. Furthermore, a composite image may be generated using computer graphics or the like by estimating a three-dimensional model of the passerby A2 and appropriately arranging the presentation images b11 to b14 in accordance with the estimated three-dimensional model. Furthermore, a three-dimensional composite image may be arranged by simply providing shade or the like. The presentation images b11 and b12 are images representing a state in which the design of shoulders of a dress is changed, and the presentation images b13 and b14 are images representing a state in which hair is cut to short length.

In step 108, the target region identification unit 54 identifies a target region corresponding to the passerby whose image is to be combined with the presentation image from the frame image.

Figure 9:
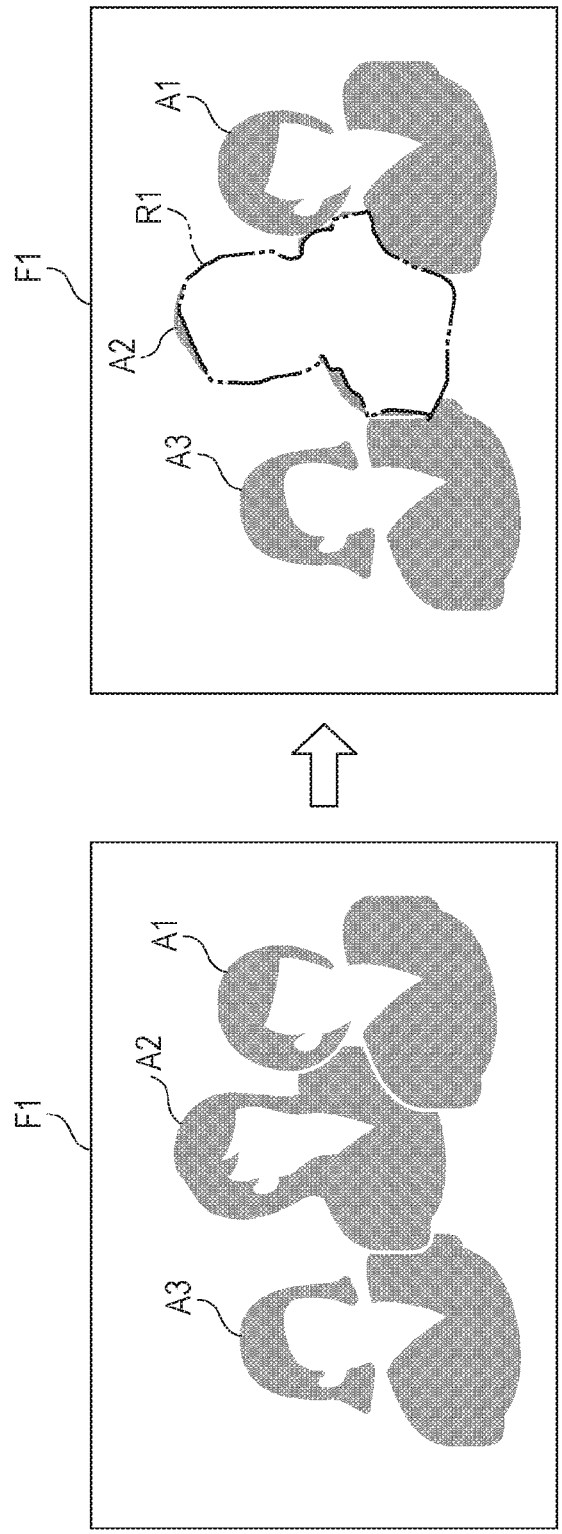
FIG. 9 is a diagram illustrating an example of a state in which a target region corresponding to a passerby is identified from a frame image in an exemplary embodiment.

FIG. 9 is a diagram illustrating an example of a state in which a target region R1 corresponding to the passerby A2 is identified from the frame image F1 in this exemplary embodiment.

The target region R1 illustrated in FIG. 9 is a region corresponding to the image of the passerby A2 in the frame image F1, and is identified using, for example, an image recognition technique based on machine learning. Specifically, a technique such as Graph Cuts or DeepMask regarding image recognition is used.

In step 110, the partial region identification unit 55 identifies a partial region in which the composite image generated by the image composing unit 53 and the target region identified by the target region identification unit 54 do not overlap. The target region identification unit 54 and the partial region identification unit 55 are an example of an identification unit. In this example, for convenience of explanation, the target region identification unit 54 and the partial region identification unit 55 are separated from each other. However, the target region identification unit 54 and the partial region identification unit 55 may be configured as a single identification unit.

Figure 10:
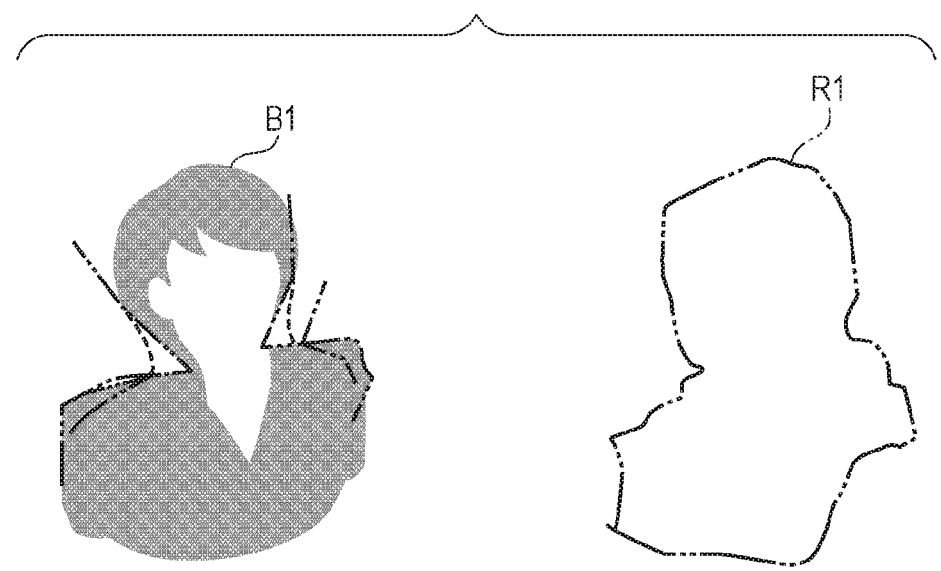
FIG. 10 is a diagram illustrating an example of a composite image and a target region in an exemplary embodiment.

FIG. 10 is a diagram illustrating an example of the composite image B1 and the target region R1 in this exemplary embodiment.

Figure 11:
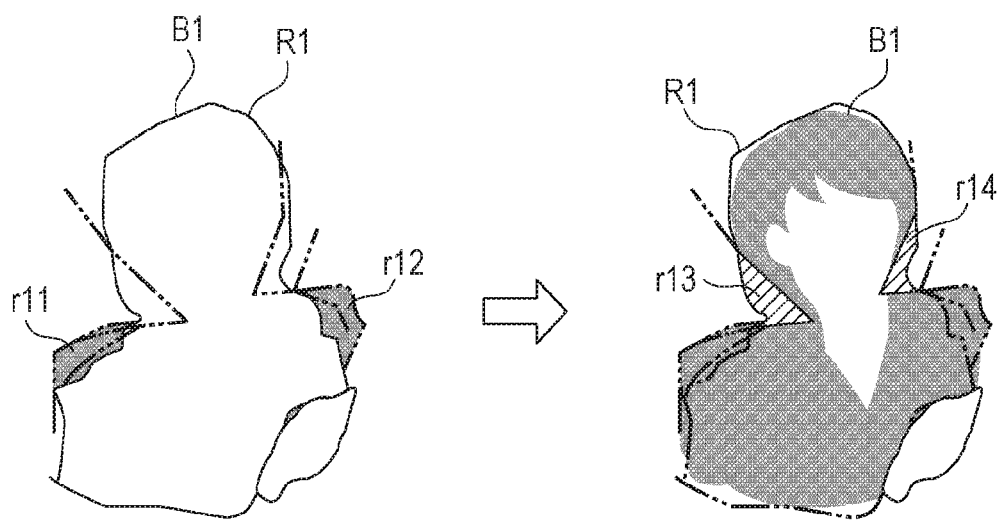
FIG. 11 is a diagram illustrating an example of a state in which a composite image and a target region are superimposed on each other in an exemplary embodiment.

FIG. 11 is a diagram illustrating an example of a state in which the composite image B1 and the target region R1 are superimposed on each other in this exemplary embodiment.

For example, in the case where the target region R1 and the composite image B1 illustrated in FIG. 10 are superimposed on each other, the partial region identification unit 55 identifies a region in which the target region R1 and the composite image B1 do not overlap as a partial region.

As illustrated in a left part of FIG. 11, in the case where the target region R1 is superimposed on the composite image B1, partial regions r11 and r12 are identified. The partial regions r11 and r12 are not included in the target region R1 but are included in the composite image B1. That is, the partial regions r11 and r12 are regions corresponding to the presentation images b11 and b12 illustrated in FIG. 8, and are defined as part of the composite image B1.

In contrast, as illustrated in a right part of FIG. 11, in the case where the composite image B1 is superimposed on the target region R1, partial regions r13 and r14 are identified. The partial regions r13 and r14 are included in the target region R1 but are not included in the composite image B1. That is, the partial regions r13 and r14 are regions eliminated from the image region of the passerby A2 by combining the image of the passerby A2 with the presentation images b13 and b14 illustrated in FIG. 8, and are defined as part of the target region R1.

In step 112, the depth determination unit 56 performs a depth determination process for the partial region identified by the partial region identification unit 55 in accordance with a sub-routine process illustrated in FIG. 5.

In step 200 of FIG. 5, the depth determination unit 56 determines whether or not the partial region identified by the partial region identification unit 55 is part of the composite image. In the case where it is determined that the partial region is not part of the composite image (in the case where the determination result is negative), the sub-routine process proceeds to step 202. In contrast, in the case where it is determined that the partial region is part of the composite image (in the case where the determination result is affirmative), the sub-routine process proceeds to step 204.

In step 202, the depth determination unit 56 determines that the partial region is part of the target region, and the sub-routine process proceeds to step 210.

In step 204, the depth determination unit 56 determines whether or not a relationship that the depth of the partial region is lower than the depth of an image around the target region is satisfied. In the case where the relationship is satisfied (in the case where the determination result is affirmative), the sub-routine process proceeds to step 206. In contrast, in the case where it is determined that the relationship is not satisfied (in the case where the determination result is negative), the sub-routine process proceeds to step 208.

In step 206, the depth determination unit 56 determines that the partial region is on a front side of the image around the target region.

In step 208, the depth determination unit 56 determines that the partial region is on a rear side of the image around the target region.

That is, in the case where the partial region identified by the partial region identification unit 55 is part of the composite image, the depth determination unit 56 determines the front-rear relationship between the partial region and the image around the target region. Specifically, for example, a method for acquiring depth information representing the distance from each of the plural photographing devices 30 illustrated in FIG. 2 and an object and associating the acquired depth information with each pixel of a frame image may be used. Infrared sensors, ultrasonic sensors, or the like may be used in place of the photographing devices 30 so that depth information representing the distance from the sensors to an object may be acquired. Also in this case, the front-rear relationship may be identified using machine learning. The depth determination unit 56 is an example of a first determination unit.

In step 210, the depth determination unit 56 determines whether or not determination of depth is performed for all the partial regions. In the case where it is determined that determination of depth is performed for all the partial regions (in the case where the determination result is affirmative), the sub-routine process ends, and the process proceeds to step 114 of FIG. 4. In contrast, in the case where determination of depth is not performed for all the partial regions (in the case where the determination result is negative), the sub-routine process returns to step 200, and a series of processing operations is repeated.

In step 114 of FIG. 4, the embedding unit 57 embeds the composite image generated by the image composing unit 53 into the frame image in accordance with the determination results obtained by the depth determination unit 56. Specifically, in the case where the depth determination unit 56 determines that the partial region is on a front side of the image around the target region, the embedding unit 57 embeds the partial region on the front side of the image around the target region. In contrast, in the case where the depth determination unit 56 determines that the partial region is on a rear side of the image around the target region, the embedding unit 57 embeds the partial region on the rear side of the image around the target region.

In the example of FIG. 11, the partial region r11 is embedded on a front side of the image of the passerby A3, and part of the partial region r12 is embedded on a rear side of the image of the passerby A1.

In contrast, in the case where the depth determination unit 56 determines that the partial region is part of the target region, the embedding unit 57 embeds a complementary image into a part of the frame image corresponding to the partial region. That is, a complementary image is embedded into a region that is included in the original image before composition but is not included in the composite image, so that feeling of discomfort may be reduced. For a complementary image, for example, a pixel value of a corresponding part may be acquired from a frame image before or after the frame image into which the complementary image is to be embedded. Alternatively, the average of pixel values of a corresponding part may be acquired from frame images before and after the frame image into which the complementary image is to be embedded. In this case, for example, by temporarily storing frame images before and after the frame image into which the complementary image is to be embedded in a buffer (not illustrated in figures), pixel values of the corresponding part may be acquired.

In the example of FIG. 11, complementary images are embedded into parts corresponding to the partial regions r13 and r14.

Then, the output unit 58 outputs the frame image into which the composite image is embedded by the embedding unit 57 to the display device 20, and the resultant frame image is displayed on the display screen 22 of the display device 20. Frame images into which a composite image is embedded are continuously displayed as a moving image for a certain period of time. After the certain period of time has passed, a target is switched to different related passersby, and the composite image display processing continues to be performed.

Figure 12:
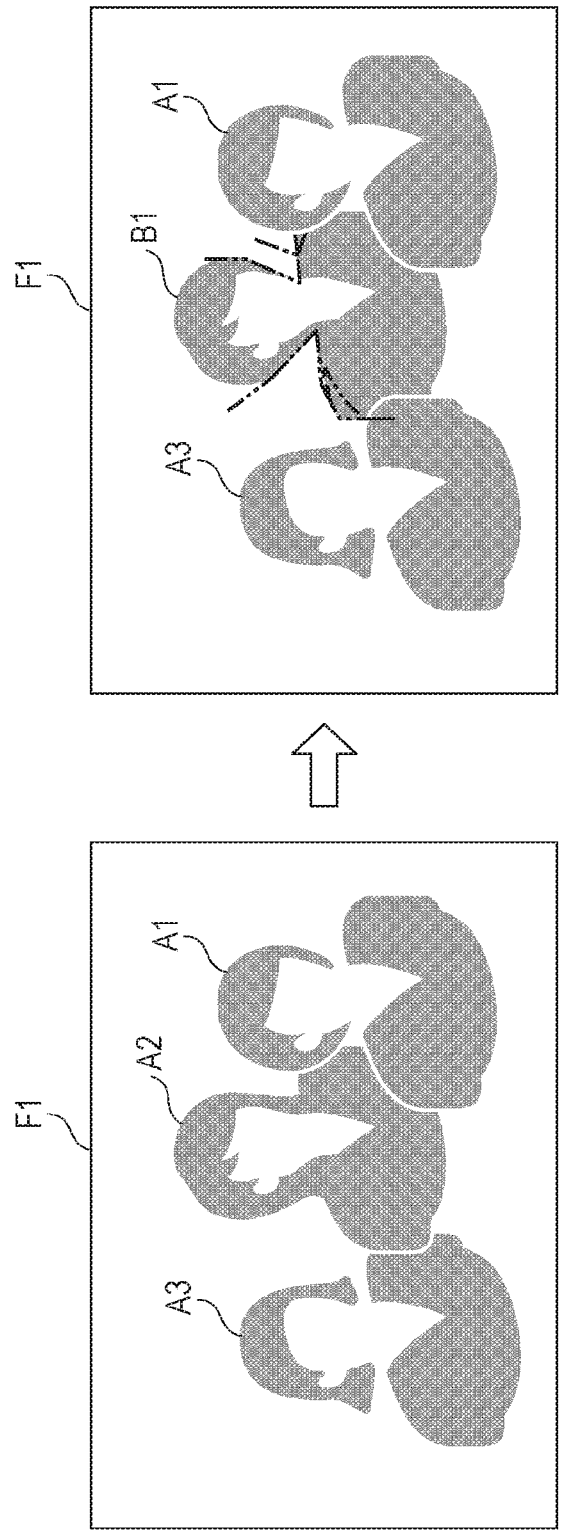
FIG. 12 is a diagram illustrating an example of a frame image into which a composite image is embedded in an exemplary embodiment.

FIG. 12 is a diagram illustrating an example of the frame image F1 into which the composite image B1 is embedded in this exemplary embodiment.

As illustrated in FIG. 12, the composite image B1 for the passerby A2 is embedded into the frame image F1, and the frame image F1 into which the composite image B1 is embedded is displayed on the display screen 22.

According to the first exemplary embodiment, a composite image of at least one passerby out of plural passersby who are related to each other is displayed. Therefore, compared to a case where a composite image of a passerby out of plural passersby who are not related to each other is displayed, a highly effective appeal may be achieved.

That is, in the first exemplary embodiment, a composite image in which the hair style and the design of clothes of the passerby A2 are changed is displayed. It is assumed that the passerby A2 is related to the other passersby A1 and A3 and the passersby A1 to A3 are highly likely to be friends or the like. With the relationship of the passersby A1 to A3, even if the passerby A2 is not interested in the composite image, it may be considered that there is a high possibility that the passersby A1 and A3 view the composite image of the passerby A2 and tell the passerby A2 their opinion that the short cut suits the passerby A2 or the like. Thus, the possibility that the opinion of the passersby A1 an A3 makes the passerby A2 to like the hair style or the design of clothes in the composite image increases. Consequently, a highly effective appeal may be achieved.

Figure 13:
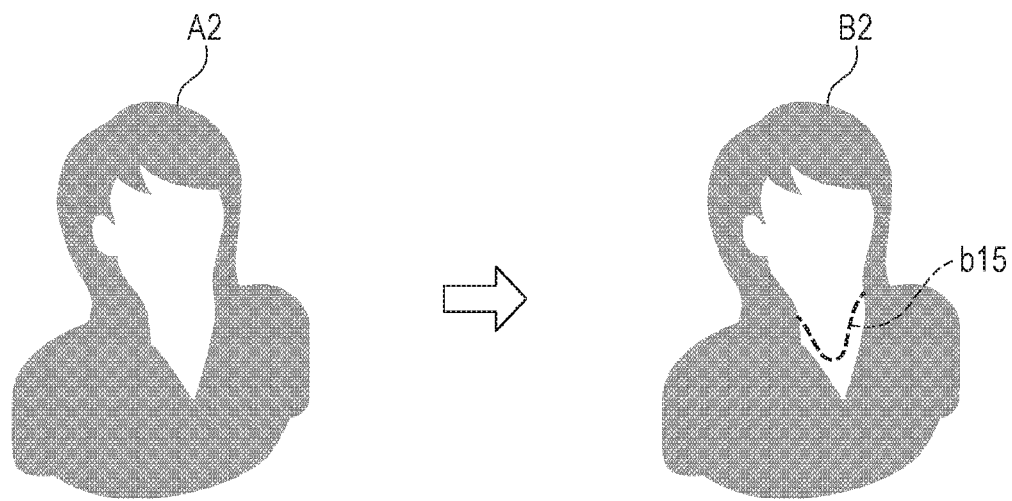
FIG. 13 is a diagram illustrating an example of a composite image that is composed of an image of a passerby and another presentation image in an exemplary embodiment.

FIG. 13 is a diagram illustrating an example of a composite image B2 obtained by combining another presentation image b15 with the image of the passerby A2 in this exemplary embodiment.

As illustrated in FIG. 13, the composite image B2 is generated by combining the image of the passerby A2 with the presentation image b15. The presentation image b15 in this example is an image representing a necklace. The presentation image b15 may be prepared in advance in association with an adverting target and stored in the memory 14 or the like. For example, images of various products such as accessories other than necklaces, clothes, hats, handbags, bags, and shoes may be used as the presentation image b15.

A case where a related target whose image is to be combined with a presentation image is a passerby has been described above. However, a related target whose image is to be combined with a presentation image may be a pet accompanied by a passerby.

Figure 14:
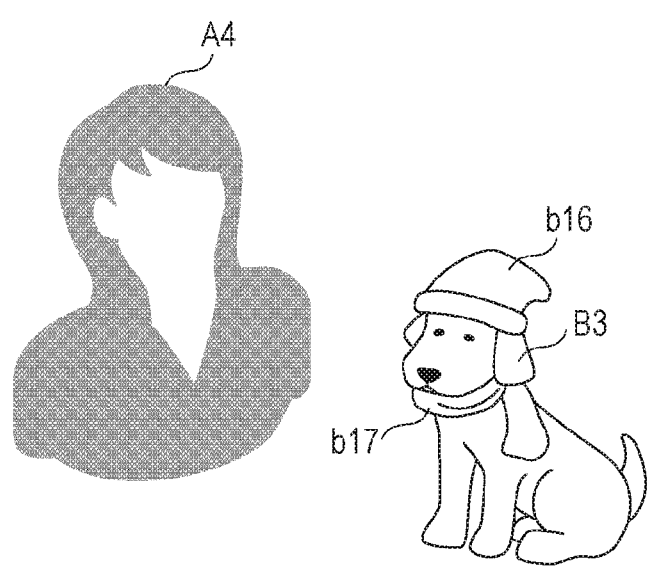
FIG. 14 is a diagram illustrating an example of a composite image that is composed of an image of a pet accompanied by a passerby and presentation images in an exemplary embodiment.

FIG. 14 is a diagram illustrating an example of a composite image B3 obtained by combining an image of a pet accompanied by a passerby A4 and presentation images b16 and b17 in this exemplary embodiment.

As illustrated in FIG. 14, the selection unit 52 selects, as plural related targets that are related to each other, the passerby A4 and a pet that have moved together for a predetermined time or more, and selects the pet as a related target whose image is to be combined with the presentation images b16 and b17. The passerby A4 and a pet that have stayed together for a predetermined time or more may be selected. The presentation image b16 in this example is an image representing a hat for pets, and the presentation image b17 is an image representing a scarf for pets. The composite image B3 is generated by combining an image of the pet accompanied by the passerby A4 with the presentation images b16 and b17.

In this case, it may be common for owners of pets have a keen interest in their pets. Therefore, by presenting the composite image B3, which is nice, to the passerby A4, there is a high possibility that the passerby A4 likes a product in the composite image B3. A highly effective appeal may thus be achieved.

Second Exemplary Embodiment

Figure 15:
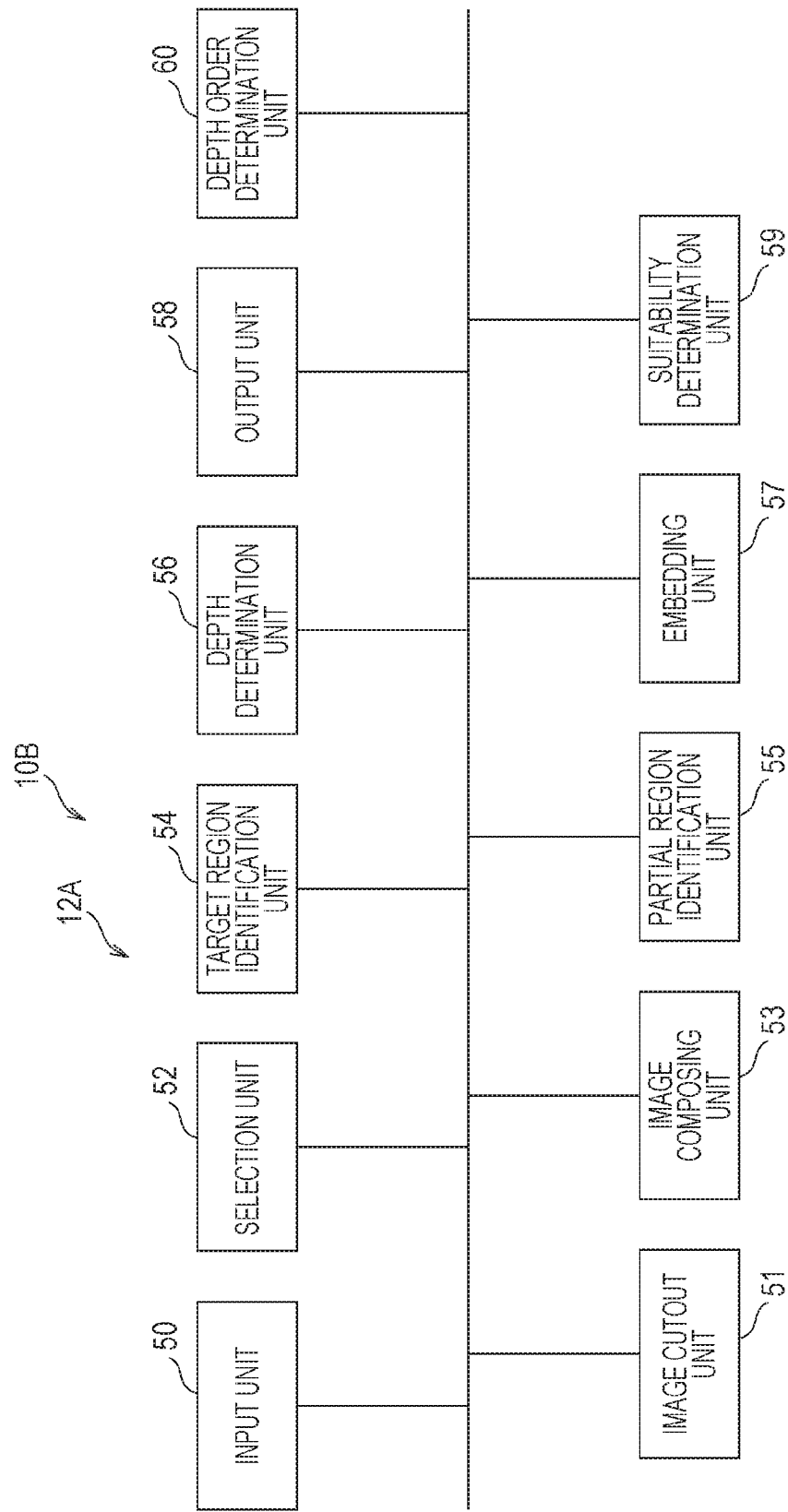
FIG. 15 is a block diagram illustrating an example of a functional configuration of an information processing device according to a second exemplary embodiment.

FIG. 15 is a block diagram illustrating an example of a functional configuration of an information processing device 10B according to a second exemplary embodiment.

As illustrated in FIG. 15, the CPU 12A of the information processing device 10B according to the second exemplary embodiment functions as a suitability determination unit 59 and a depth order determination unit 60, in addition to the units described above in the first exemplary embodiment. The CPU 12A functions as the above units when writing the program 14A stored in the memory 14 into the RAM 12C and executing the program 14A.

In the first exemplary embodiment, processing for embedding a complementary image into a region that is included in the original image before composition but is not included in the composite image is performed. For example, in the case where a human body, in particular, a face, hand, foot, or the like of a human, is embedded as a complementary image, an unnatural image may be embedded.

In the information processing device 10B according to the second exemplary embodiment, the suitability determination unit 59 compares a complementary image with a reference image so that suitability of the complementary image may be determined. The suitability determination unit 59 is an example of a second determination unit.

Specifically, plural types of reference images are stored in advance in the memory 14. That is, an appropriate image that is acceptable as a complementary image and an inappropriate image that is not acceptable as a complementary image are identified by machine learning, and learning data obtained by the machine learning is stored as plural types of reference images in the memory 14. For human faces, for example, an image with two eyes is identified as an appropriate image, and an image with three or more eyes is identified as an inappropriate image. The suitability determination unit 59 compares a complementary image with a reference image, and determines whether the complementary image is an acceptable, appropriate image or an unacceptable, inappropriate image. In the case where the complementary image is determined to be an appropriate image, a frame image into which the complementary image is embedded is displayed. In contrast, in the case where the complementary image is determined to be an inappropriate image, embedding of the complementary image into the frame image is canceled. In the case where the complementary image is determined to be an inappropriate image, display of a composite image may be canceled.

A case where one composite image is present in one frame image has been described above. However, this exemplary embodiment may also be applied to a case where plural composite images are present in one frame image.

In this case, the depth order determination unit 60 determines the order of the depth of plural composite images in a frame image. For example, with the plural photographing devices 30 illustrated in FIG. 2, depth information representing the distance from each of the photographing devices 30 to an object is acquired, the acquired depth information is associated with each pixel in a frame image, and the order of the depth of the plural composite images is determined based on the depth information. The depth order determination unit 60 is an example of a third determination unit.

The embedding unit 57 embeds plural composite images into a frame image in accordance with the order of depth determined by the depth order determination unit 60. Specifically, composite images are embedded into a frame image sequentially from a composite image with a higher depth, that is, from a composite image with a longer distance to the photographing device 30.

Third Exemplary Embodiment

Figure 16:
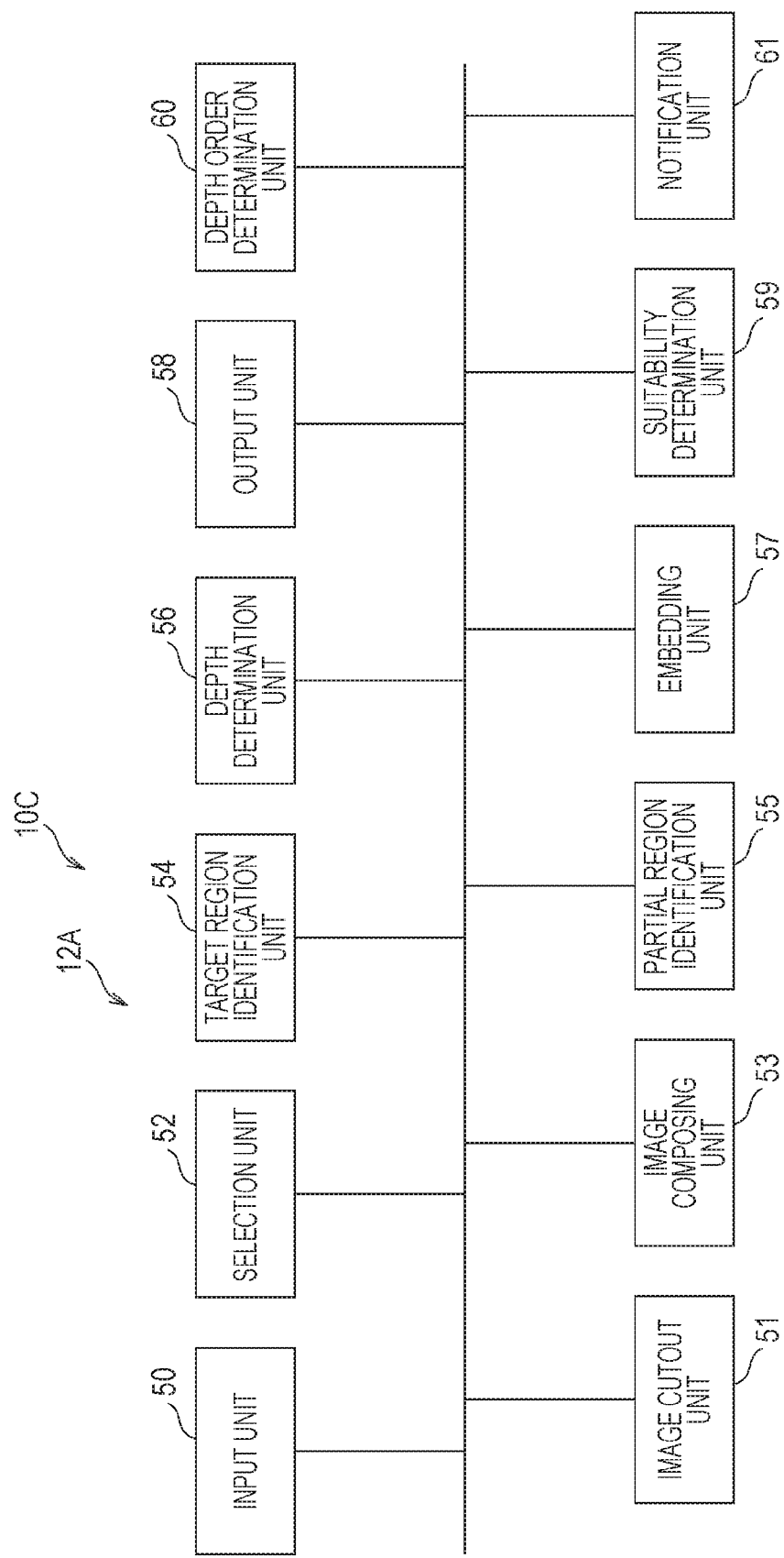
FIG. 16 is a block diagram illustrating an example of a functional configuration of an information processing device according to a third exemplary embodiment.

FIG. 16 is a block diagram illustrating an example of a functional configuration of an information processing device 10C according to a third exemplary embodiment.

As illustrated in FIG. 16, the CPU 12A of the information processing device 10C according to the third exemplary embodiment functions as a notification unit 61, in addition to the units described above in the second exemplary embodiment. The CPU 12A functions as the above units when writing the program 14A stored in the memory 14 into the RAM 12C and executing the program 14A.

In the first and second exemplary embodiments, it is assumed that any of plural passersby who are related to each other views the display screen 22. However, no passerby may view the display screen 22.

In the information processing device 10C according to the third exemplary embodiment, the notification unit 61 sends a notification of display of a frame image into which a composite image is embedded on the display screen 22. With the notification, the possibility that any of plural passersby who are related to each other views the display screen 22 increases. The timing of notification may be immediately after a frame image is displayed on the display screen 22, immediately before a frame image is displayed on the display screen 22, or at the same time as the timing when a frame image is displayed on the display screen 22.

Figure 17:
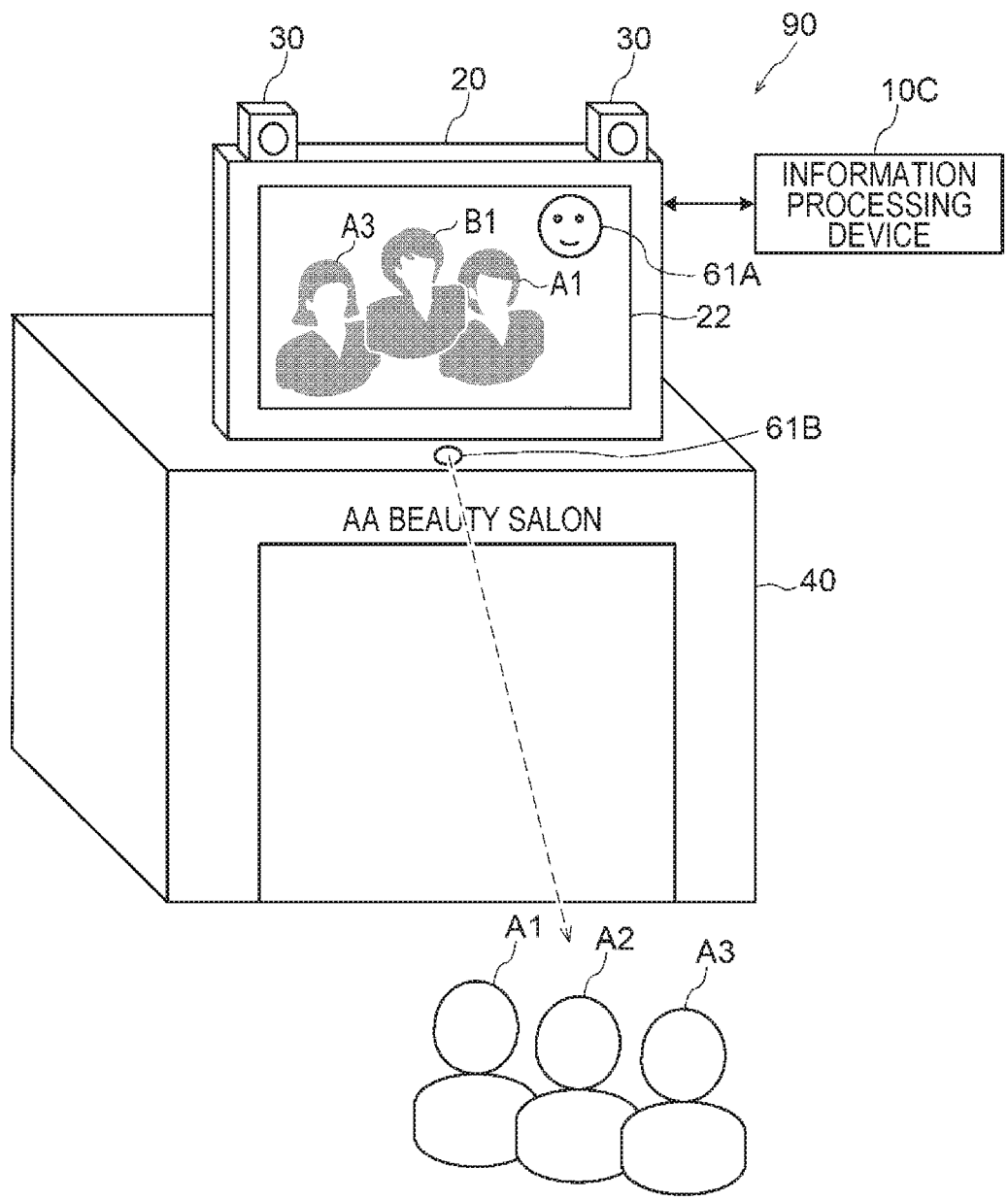
FIG. 17 is a perspective view illustrating an example of how devices configuring a display system according to a third exemplary embodiment are installed.

FIG. 17 is a perspective view illustrating an example of how devices configuring the display system 90 according to the third exemplary embodiment are installed.

As illustrated in FIG. 17, the notification unit 61 provides a caution for prompting at least one of the passersby A1 to A3 who are related to each other to look at the display screen 22. As an example of a caution, an image of a specific person 61A is displayed on the display screen 22, so that the passersby A1 to A3 are made to feel that they are looked at by the specific person 61A. It is desirable that the specific person 61A is a person who is widely known and does not make the passersby A1 to A3 to feel discomfort, such as a good-looking actor, an actress, an idle, or the like. Furthermore, an image of the specific person 61A is not obtained by being captured as an actual moving image including the passersby A1 to A3. Therefore, displaying the image of the specific person 61A permanently may make the passersby A1 to A3 to feel uneasiness. Thus, it is preferable that the image of the specific person 61A is deleted after having been displayed for a predetermined time.

Furthermore, as another example of a caution, a low-energy laser beam may be applied using a laser pointer 61B so that the passersby A1 to A3 may notice the laser beam. For example, a safe laser beam which is not harmful to eyes such as a laser beam with a laser class of "Class 1" or "Class 1M" defined by JIS C 6802 is used. Directly applying a laser beam to the passersby A1 to A3 may provide discomfort feeling. Therefore, it is desirable that a laser beam is applied to a specific place in front of the shop 40 or the like that may be visually recognized by the passersby A1 to A3.

Furthermore, a group of plural passersby who look at the display screen 22 may be defined as a target of image composing processing. In this case, the line of sight of at least one of plural passersby is detected using a publicly known visual line detection technique. It is highly likely that all members of a group including one passerby who is looking at the display screen 22 look at the display screen 22. Therefore, a highly effective appeal may be achieved.

Information processing devices and display systems according to exemplary embodiments have been described as examples. An exemplary embodiment may include a program for causing a computer to execute functions of units included in an information processing device. An exemplary embodiment may include a computer-readable recording medium in which the program is stored.

A configuration of an information processing device described in any of the foregoing exemplary embodiments is merely an example. Changes may be made in accordance with a condition without departing from the scope of the present invention.

Furthermore, the flow of a process of a program described in any of the forgoing exemplary embodiments is merely an example. Deletion of an unnecessary step, addition of a new step, or change of a processing order may be performed without departing from the scope of the present invention.

In the forgoing exemplary embodiments, a case where a process according to an exemplary embodiment is implemented by executing a program with a software configuring using a computer has been described. However, the present invention is not limited to this. An exemplary embodiment may be implemented by, for example, a hardware configuration or a combination of a hardware configuration and a software configuration.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing device comprising:
at least one hardware processor configured to implement:
selecting, based on a plurality of obtained frame images of a video and in a case where the frame images are both obtained by photographing a plurality of targets t at are present in front of a display screen of a display device and are also displayed on the display screen, the targets comprising at least one of first targets of persons and second targets of at least one a person and at least one animal;
selecting an image, of at least one of the targets and in response to determining that the at least one of the targets comprises a predetermined attribute, as a selected image, the predetermined attribute being at least one of a thing which the at least one of the targets wears, an age of the at least one of the targets, and a gender of the at least one of the targets;
embedding a composite image, obtained by composing both at least part of the selected image and also an additional image, into at least one of the plurality of obtained frame images to generate output frame images of the video; and
outputting the output frame images of the video to the display device,
wherein the at least one of the plurality of obtained frame images comprises the at least one of the first targets of the persons and the second targets of the at least one person and the at least one animal at different locations than in a second one of the plurality of obtained frame images, and
wherein the at least one hardware processor is further configured to implement, in response to selecting the targets, determining that the at least one of the targets comprises the predetermined attribute, and
wherein selecting the targets comprises determining that the targets have been present in front of the display screen for a predetermined amount of time.

2. The information processing device according to claim 1, wherein the predetermined attribute is an attribute representing the at least one animal.

3. The information processing device according to claim 1, wherein the at least one hardware processor is further configured to:
identify a target region corresponding to the at least one of the targets from the at least one of the plurality of obtained frame images, and identifies a partial region in which the composite image and the target region do not overlap;
determine, in a case where the partial region is part of the composite image, a depth relationship of the partial region and an image of a background; and
embedding, in a case where the partial region is on a front side of the image of the background, the partial region onto the front side of the image of the background,
wherein the partial region and the target region are portions of the at least one of the plurality of frame images into which the composite image is embedded.

4. The information processing device according to claim 1, wherein the at least one hardware processor is further configured to:
identify a target region corresponding to the at least one of the targets from the at least one of the plurality of obtained frame images, and identifies a partial region in which the composite image and the target region do not overlap;
determine, in a case where the partial region is part of the composite image, a depth relationship of the partial region and an image of a background; and
embedding, in a case where the partial region is on a front side of the image of the background, the partial region onto the front side of the image of the background,
wherein the partial region and the target region are portions of the at least one of the plurality of frame images into which the composite image is embedded.

5. The information processing device according to claim 3,
wherein the at least one hardware processor is further configured to implement, in a case where the partial region is part of the target region, embedding a complementary image into a part of the at least one of the plurality of obtained frame images corresponding to the partial region.

6. The information processing device according to claim 5, wherein the at least one hardware processor is further configured to implement:
determining a suitability of the complementary image by comparing the complementary image with a predetermined reference image; and
in a case the complementary image is determined to be not appropriate, canceling embedding of the complementary image into the at least one of the plurality of obtained frame images.

7. The information processing device according to claim 6, wherein the at least one hardware processor is further configured to implement:
determining, in a case where a plurality of composite images are present, an order of depth of the plurality of composite images in the at least one of the plurality of obtained frame images; and
embedding the plurality of composite images into the at least one of the plurality of obtained frame images in accordance with the order of the depth.

8. The information processing device according to claim 1, wherein the at least one hardware processor is further configured to implement:
outputting a notification that the at least one of the plurality of obtained frame images into which the composite image is embedded is displayed on the display screen.

9. A display system comprising:
a display device that includes a display screen;
a photographing device configured to photograph a plurality of targets that are present in front of the display screen; and
the information processing device according to claim 1 configured to acquire the frame images as captured by the photographing device and to control the acquired frame images to be displayed on the display device.

10. The information processing device according to claim 1, wherein
the composite image is obtained such that at least one of a hairstyle and a clothing of the at least one target is changed.

11. A non-transitory computer readable medium storing a program causing a computer to execute a process for information processing, the process comprising:

selecting, based on a plurality of obtained frame images of a video and in a case where the frame images are both obtained by photographing a plurality of targets that are present in front of a display screen of a display device and are also displayed on the display screen, the targets comprising at least one of first targets of persons and second targets of at least one person and at least one animal;

selecting an image, of at least one of the targets and in response to determining that the at least one of the targets comprises a predetermined attribute, as a selected image, the predetermined attribute being at least one of a thing which the at least one of the targets wears, an age of the at least one of the targets, and a gender of the at least one of the targets;

embedding a composite image, obtained by composing both at least part of the selected image and also an additional image, into at least one of the plurality of obtained frame images to generate output frame images of the video; and outputting the output frame images of the video to the display device, wherein the at least one of the plurality of obtained frame images comprises the at least one of the first targets of the persons and the second targets of the at least one person and the at least one animal at different locations than in a second one of the plurality of obtained frame images, and wherein the process further comprises, in response to selecting the targets, determining t hat the at least one of the targets comprises the predetermined attribute, and wherein selecting the targets comprises determining that the targets have been present in front of the display screen for a predetermined amount of time.

12. An information processing device comprising:

at least one hardware processor configured to implement:

selecting, based on a plurality of obtained frame images of a video and in a case where the frame images are both obtained by photographing a plurality of passerbys that are present in front of a display screen of a display device by a photographing device placed such that the photographing device photographs the plurality of passerbys and are also displayed on the display screen, a plurality of related targets that are related to each other among the plurality of passerbys, based on a plurality of obtained frame images, wherein the plurality of related targets comprising at least one of first targets of persons, who have at least one of moved and stayed together for at least predetermined time, and second targets of at least one person and at least one animal who have at least one of moved and stayed together for at least the predetermined time;

selecting an image, of at least one target and in response to determining that the at least one target comprises a predetermined attribute from the related targets, as a selected image;

embedding a composite image, obtained by composing an image of both at least part of the selected image and also an additional image, into at least one of the plurality of obtained frame images to generate output frame images of the video; and outputting the output frame images of the video to the display device, wherein the at least one of the plurality of obtained frame images comprises the at least one of the first targets of the persons and the second targets of the at least one person and the at least one animal at different locations than in a second one of the plurality of obtained frame images, and wherein selecting the targets comprises determining that the targets have been present in front of the display screen for a predetermined amount of time.

* * * * *